(No Model.)

J. M. TUFTS.
WEEDER ATTACHMENT FOR HORSE RAKES.

No. 546,440. Patented Sept. 17, 1895.

WITNESSES:
W. E. Tomlinson
C. L. Bendixon

INVENTOR:
John M. Tufts
By E. Laass
his ATTORNEY

UNITED STATES PATENT OFFICE.

JOHN M. TUFTS, OF WAMPSVILLE, NEW YORK.

WEEDER ATTACHMENT FOR HORSE-RAKES.

SPECIFICATION forming part of Letters Patent No. 546,440, dated September 17, 1895.

Application filed June 17, 1895. Serial No. 553,009. (No model.)

*To all whom it may concern:*

Be it known that I, JOHN M. TUFTS, of Wampsville, in the county of Madison, in the State of New York, have invented new and useful Improvements in Weeder Attachments to Horse-Rakes, of which the following, taken in connection with the accompanying drawings, is a full, clear, and exact description.

The object of this invention is to equip a horse hay-rake with a weeding implement which shall be readily attached to the rake and adapted to be used interchangeably therewith whenever desired, and when thus applied it shall be efficient in its operation; and to that end the invention consists, chiefly, in the combination, with the rake-head supported on a carrying-wheel, of a supplemental head extending lengthwise of said rake-head and pivoted to turn on its axis and weeding-tines attached to said supplemental head, all as hereinafter more fully described, and specifically set forth in the claims.

Figure 1:
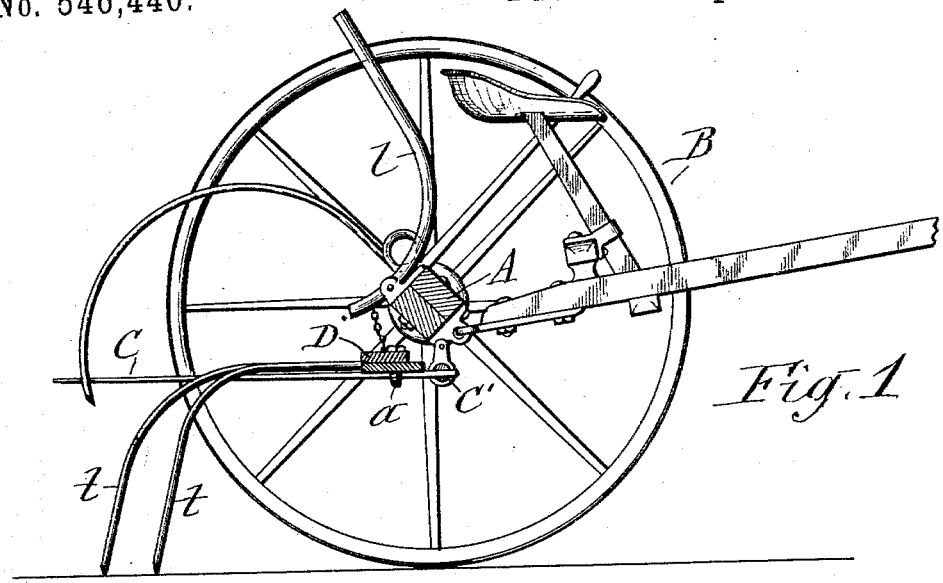
Figure 2:
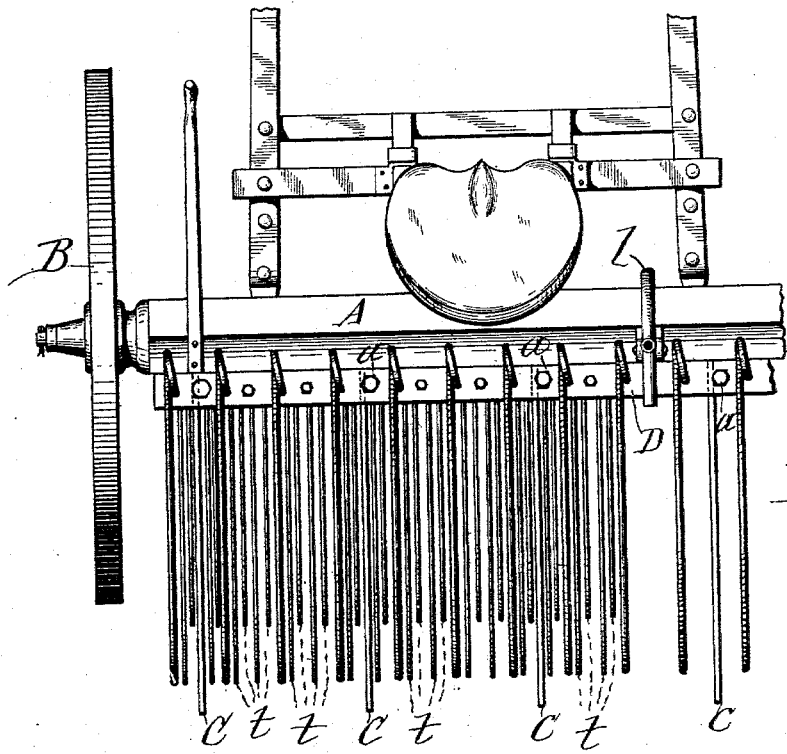
Figure 3:
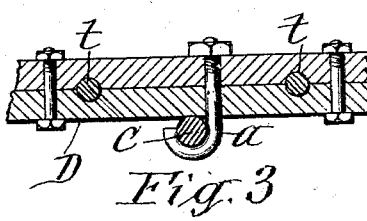

In the annexed drawings, Figure 1 is a vertical longitudinal section of a horse hay-rake equipped with my improved weeding implement. Fig. 2 is a sectional plan view of the same, and Fig. 3 is an enlarged detail view of the construction and attachment of the head of the weeding implement.

Similar letters of reference indicate corresponding parts.

A represents the rake-head, which may be of any suitable or well-known construction and is supported on carrying-wheels B in the usual manner.

C denotes the usual rake-cleaner, the head C' of which is hinged to the rake-head, so as to allow said cleaner-head to turn on its longitudinal axis.

D represents a supplemental head which extends lengthwise of the rake-head and is mounted on the cleaner-fingers C C adjacent to the head C' and secured thereto by suitable clips or hooked bolts $a$, passing through said supplemental head and embracing by their hooked ends the cleaner-fingers C, as illustrated in Fig. 3 of the drawings. The opposite end of the hooked bolt is provided with a nut by which to tighten the hold of the bolt on the finger C. Said hooked bolts greatly facilitate the attachment and detachment of the weeder.

To the supplemental head D are attached the weeding-tines F F, which extend rearward and downward from the head, so as to allow the free ends of the tines to be brought in contact with the ground when desired.

To the cleaner is connected a hand-lever $l$, by which the person in charge of the machine can tilt the cleaner when desired, and this operation likewise tilts the head D of the weeder.

To increase the efficiency of the weeder the alternate tines F F are terminated with their free ends in a row in advance of those of the intermediate tines, as shown more clearly in Fig. 2 of the drawings.

One of the great advantages of my invention is derived from the detachability of the weeder from the rake, and when detached the weeder is a simple light article of such a shape as to allow it to be easily stored or hung up in the barn or shed, the rake being left in proper condition for use.

What I claim as my invention is—

1. The combination, with the rake-head supported on carrying wheels, of a supplemental head extending lengthwise of said rake-head and pivoted to turn on its axis, and weeding-tines attached to said supplemental head as set forth.

2. The combination, with the rake-head and rake-cleaner hinged to said head, of a supplemental head secured to the fingers of said cleaner adjacent to the head of the latter and weeding teeth attached to the supplemental head.

3. The combination, with a horse hay-rake provided with vertically swinging cleaner fingers, of a head mounted upon said fingers adjacent to the rake-head, clips detachably securing said head to the fingers, and tines extending rearward and downward from said head as set forth.

In testimony whereof I have hereunto signed my name this 12th day of June, 1895.

JOHN M. TUFTS. [L. S.]

Witnesses:
JOHN J. LAASS,
A. M. BENEDICT.